US012762549B2

(12) United States Patent
Nayak

(10) Patent No.: US 12,762,549 B2
(45) Date of Patent: Oct. 13, 2026

(54) SECURE TRANSACTION AUTHORIZATION

(71) Applicant: Cardtronics USA, Inc., Atlanta, GA (US)

(72) Inventor: Dinesh Kumar Nayak, Berhampur (IN)

(73) Assignee: Cardtronics USA, Inc., Atlanta, GA (US)

( * ) Notice: Subject to any disclaimer, the term of this patent is extended or adjusted under 35 U.S.C. 154(b) by 103 days.

(21) Appl. No.: 18/392,531

(22) Filed: Dec. 21, 2023

(65) Prior Publication Data

US 2025/0209447 A1 Jun. 26, 2025

(51) Int. Cl.
*G06Q 20/38* (2012.01)
*G06Q 20/40* (2012.01)

(52) U.S. Cl.
CPC ....... *G06Q 20/3825* (2013.01); *G06Q 20/389* (2013.01); *G06Q 20/401* (2013.01)

(58) Field of Classification Search
CPC . G06Q 20/3825; G06Q 20/389; G06Q 20/401
USPC .......................................................... 705/75
See application file for complete search history.

(56) References Cited

U.S. PATENT DOCUMENTS

| | | | |
|---|---|---|---|
| 2018/0225640 A1 | 8/2018 | Chapman et al. | |
| 2020/0118131 A1* | 4/2020 | Diriye | H04L 9/3239 |
| 2021/0342838 A1* | 11/2021 | Hoggard | H04L 9/088 |
| 2021/0357927 A1* | 11/2021 | Kita | G06Q 20/38215 |
| 2022/0005023 A1* | 1/2022 | Angelos | G06Q 20/4014 |
| 2022/0172198 A1* | 6/2022 | Gaur | G06Q 20/3821 |
| 2023/0419309 A1* | 12/2023 | Navarro | G06Q 20/06 |
| 2024/0062196 A1* | 2/2024 | Crintea | G06Q 20/3827 |
| 2024/0303612 A1* | 9/2024 | Ziade | G06Q 20/065 |

FOREIGN PATENT DOCUMENTS

| | | |
|---|---|---|
| WO | 2020056455 | 3/2020 |

OTHER PUBLICATIONS

Antonopoulos, Andreas M, “Mastering 1-15 G06Q Ethereum: Chapters 1, 7, 10, 11”, G07G In: “Mastering Ethereum : Building Smart Contracts and DApps”,, (Jan. 8, 2019), 92 pgs.

Chen, Che-Pin, “Conditional Token: A 1-15 New Model to Supply Chain Finance by Using Smart Contract in Public Blockchain”, Department of Management Informationsystems, National Cheng Chi University, Taipei 116011, Taiwan, vol. 2, No. 1, pp. 170-204, (2023), 35 pgs.

* cited by examiner

*Primary Examiner* — Courtney P Jones
(74) *Attorney, Agent, or Firm* — Schwegman Lundberg & Woessner, P.A.

(57) ABSTRACT

Secure blockchain (BC)-based tokens are issued and linked to payment cards and/or devices of customers. Custom conditions associated with the tokens are stored in smart contracts on a BC. The tokens are stored in a cloud-based key vault and/or in the BC. Validation of a token for access a smart contract on the BC can only be made by a financial institution (FI) to the key vault. Real-time information for a transaction device, for transaction information, and/or for the customer is provided as input data to the smart contract for evaluation of the conditions. After the token is authenticated by the key vault, the real-time information is gathered and passed to the corresponding smart contract on the BC for evaluation. The FI receives transaction authorization or transaction denial based on the smart contract's evaluation of the conditions.

6 Claims, 3 Drawing Sheets

SECURE TRANSACTION AUTHORIZATION

BACKGROUND

Cybercrimes are at all-time highs in the industry as criminals discover new ways to circumvent security. For instance, criminals now have the ability to clone a bank card and even a subscriber identity module (SIM) card of a phone. Retailers and financial institutions (FIs) now rely heavily upon one-time passwords (OTPs) for security. This is a problem if a customer's SIM card is duplicated or cloned because the OTP will be sent to a fraudsters device and the OTP can be correctly entered to complete a transaction linked to the customer. The FI will always authorize a transaction for which two-factor authentication, via the OTP, is verified. The fraudsters can engage in transactions via any online or brick-and-mortar stores while the retailers and FIs have no ability to tell whether the transactions are legitimate or not. Fraudsters can also withdrawal cash using a cloned bank card of the customer at automated teller machines (ATMs).

DETAILED DESCRIPTION

Ensuring against credit and debit card theft is challenging because fewer and fewer transactions are being conducted in person with printed currency. Electronic transactions have increased dramatically in recent years. Even in-store transactions rely upon electronic verification when a customer uses a payment card. Unfortunately, physical credit and debit cards can be cloned by thieves as can SIM cards that control the phones. Because retailers and financial institutions (FIs) rely on two-factor authentication that includes one-time only passwords (OTPs) sent to customer phones, if the SIM cards of those phones are cloned, then thieves can enter the correct OTPs and have all their fraudulent transactions verified as legitimate.

These issues are solved with the teachings presented herein and below. Customer devices and payment cards are issued unique, secure, and customizable blockchain (BC)-based tokens. Custom conditions associated with use of the tokens are managed on the BC via smart contracts. When an electronic transaction is being verified by a FI, the payment card and/or device are linked to a prior registered token, a smart contract on the BC is accessed to determine whether the conditions associated with the token are satisfied or not based on real-time transaction information, known information about the customer, and/or real-time device information for the device. The transaction is authorized by a corresponding FI to complete the transaction with proper payment to the retailer only after the token is authenticated and the conditions processed by the smart contract are satisfied. Only a registered and known FI can request that tokens be validated for transactions and once the token is validated by the FI, the smart contract is initiated from the BC to evaluate the conditions linked to the token to authenticate the transaction for payment by the FI.

Potential fraud during a transaction is substantially reduced if not completely eliminated by the teachings provided herein. Notably, existing OTPs can remain in place with the teachings herein providing additional security for a transaction. That is, the teachings herein provide an additional behind the scenes security to existing two-factor transaction authentication approaches. In an embodiment, the teachings herein can also be used to replace OTP transaction security approaches while simultaneously increasing security for the transactions beyond what is available with just the OTP security approaches.

Figure 1:
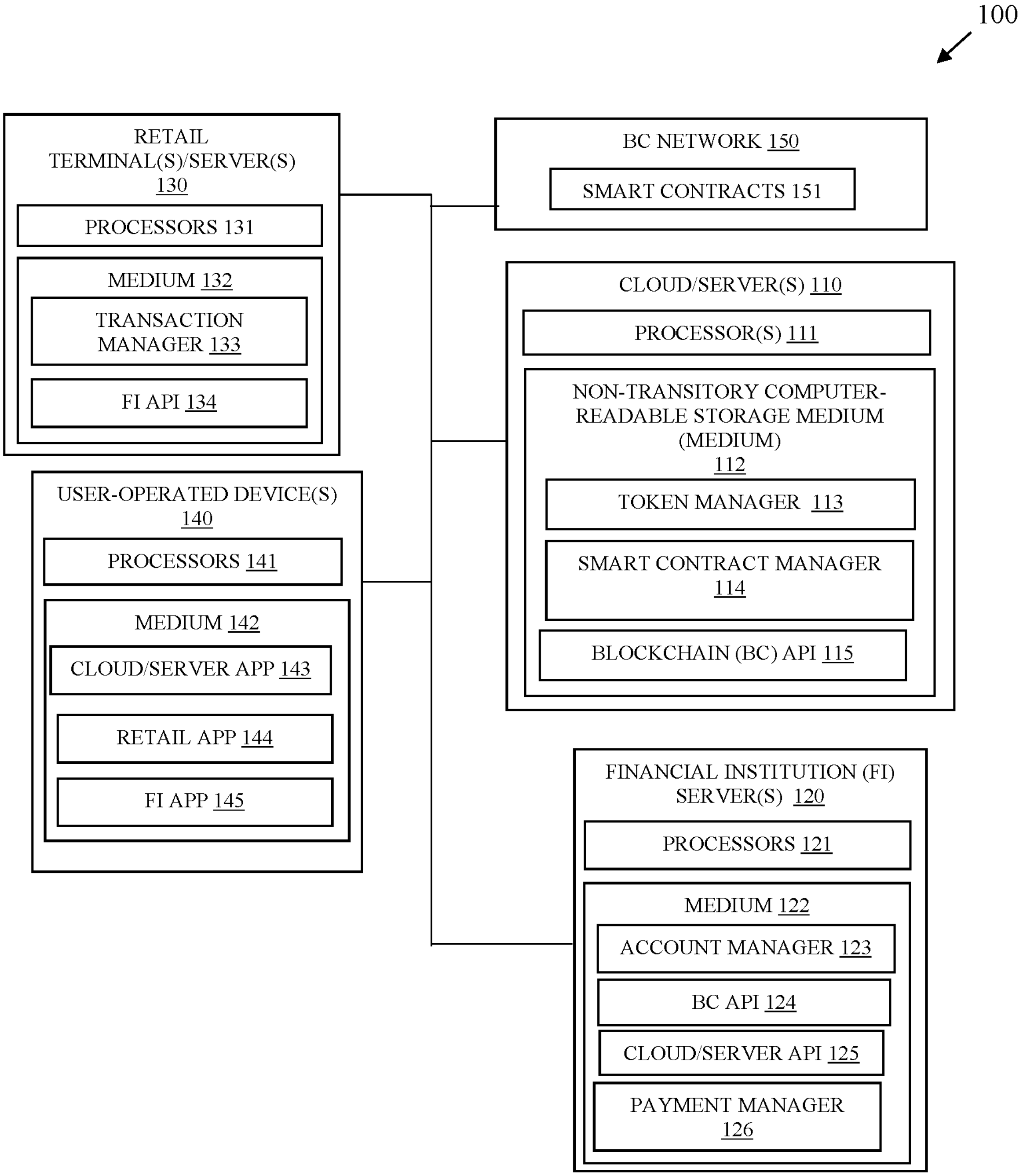
FIG. 1 is a diagram of a system for secure transaction authorization, according to an example embodiment.

FIG. 1 is a diagram of a system/platform 100 for secure transaction authorization, according to an example embodiment. Notably, the components are shown schematically in simplified form, with only those components relevant to understanding of the embodiments being illustrated.

Furthermore, the various components (that are identified in system/platform 100) are illustrated and the arrangement of the components are presented for purposes of illustration only. Notably, other arrangements with more or less components are possible without departing from the teachings of secure transaction authorization, presented herein and below.

System/platform 100 (herein after just "system 100") provides a processing environment by which secure BC tokens are issued, linked to payment cards and/or devices of customers, and linked to conditions of a smart contract on the BC. System 100 also provides an interface by which a FI provides real-time information for a transaction, a secure token associated with the transaction, customer information for a customer of the transaction, and/or a payment card account or a hash value of the payment card account for token authentication by a cloud-based key vault authentication service. The key vault service authenticates the transaction to a secure token and passes the real-time information as input to a corresponding smart contract on the BC. The smart contract evaluates the real-time information against its configured condition and provides as output a transaction authorization or a transaction denial for the transaction. When the key vault service is unable to authentication the transaction to a secure token linked to the customer, the key vault service sends a transaction denial back to the FI. Assuming the FI receives a transaction authorization, the FI processes a payment from a customer account to a retailer account of a retailer that is performing the transaction.

As used herein, the terms "customer," "consumer," "and/or "user" may be used interchangeably and synonymously herein and below. This refers to an individual that has registered at least secure token and is subsequently attempting to pay a retailer for a transaction via their FI. The transaction is either online, in person at a brick-and-mortar retail store (e.g., via a self-service terminal (SST) or point-of-sale (POS) terminal), or at an automated teller machine (ATM).

The terms "retailer" and/or "merchant" may be used interchangeably and synonymously herein and below. This refers to an entity that has is being paid by a FI to satisfy a payment required of a customer during a transaction.

Furthermore, the terms "lender," "bank," "FI," and/or "creditor" may be used interchangeably and synonymously herein and below. This refers to an entity that is supplying a payment required of the customer during a transaction with a retailer.

System 100 includes a cloud/server 110 (hereinafter just "cloud 110"), a FI server, 120, retail terminals/servers 130, user-operated devices 140), and a BC network 150. Cloud 110 includes at least one processor 111 and a non-transitory computer-readable storage medium (hereinafter just "medium") 112, which includes instructions for a token manager 113, a smart contract manager 114, and a BC application programming interface (API) 115. The instructions when provided to and executed by processor 111 cause processor 111 to perform the processing or operations discussed herein and below for 113-115.

Each FI server 120 includes at least one processor 121 and a medium 122, which includes instructions for an account manager 123, a BC API 124, a cloud/server API (hereinafter just "cloud API") 125, and a payment manager. The instructions when provided to and executed by processor 121 cause processor 121 to perform the processing or operations discussed herein and below for 123-126.

Each retail terminal/server 130 includes at least one processor 131 and a medium 132, which includes instructions for a transaction manager 133 and FI API 134. The instructions when provided to and executed by processor 131 from medium 132 cause processor 131 to perform the processing or operations discussed herein and below for 133-134.

Each user-operated device (hereinafter just "device") 140 includes at least one processor 141 and a medium 142, which includes instructions for cloud/server (hereinafter just "cloud") application (herein after just "app") 143, a retail app 144, and FI app 145. The instructions when provided to and executed by processor 141 from medium 142 cause processor 141 to perform the processing or operations discussed herein and below for 143-145.

BC Network 150 (herein after just "BC 150") is distributed over a variety of devices that participate in the BC 150. BC 150 may be a public BC, or a private BC associated with the cloud 110 and/or FI servers 120. The BC 150 includes executable instructions as smart contracts 151 in unique blocks of the BC 150.

Initially, customers operate devices 140 via cloud app 143 and interact with token manager 113 to create secure BC-based tokens. A customer can register a given created token to a payment card associated with the customer's FI and/or register a given created token to a specific customer device 140 or to more than one other customer devices 140. During registration, a user interface of cloud app 143 allows the customer to link conditions to each created token. For example, the conditions can establish a geofenced location for using a given payment card and/or a given device 140 during transactions of the customer. As another example, the conditions can indicate that a given created token is to be shared with a specific retailer (e.g., Uber Eats®, Door Dash®, Uber®, Lyft®, etc.).

Smart contract manager **11*s* generates a smart contract 151 for the conditions of each token and hashes a payment card number, a customer identifier, device identifier, and/other information linked to the token to generate a unique identifier for the smart contract 151 on the BC 150. The smart contract manager 114 further generates instructions for the smart contract 151 corresponding to the conditions, which allow the smart contract 151 to execute and evaluate the conditions on the BC 150. The instructions for the smart contract 151 also provide for reporting a transaction authorization or a transaction denial back to token manager 113. Further, the instructions for the smart contract 151 may also define input data to evaluate with the conditions; the input data is real-time information associated with a given transaction, the customer, and/or a device 140 of the customer. Smart contract manager 114 uses BC API 115 to install the smart contract 151 for each token on the BC 150**.

In an embodiment, FI app 145 includes a user-interface that interacts with account manager 123. Account manager 123 registers user-created tokens with token manager 113 through cloud API 125. In other words, an existing FI app is enhanced, and an existing FI's account manager is enhanced to perform token creation and registration on behalf of a user/customer of the FI. Token manager 113 still creates and generates the tokens linked to payment cards of the user and/or devices 140 of the user with the custom conditions and smart contract manager 114 still creating the corresponding smart contracts 151 for the tokens and initiating the smart contracts 151 on the BC 150 in the manners discussed above.

In an embodiment, once a token is registered and the corresponding smart contract 151 is initiated and installed on the BC 150, token manager 113 provides the corresponding token back to the customer. For example, cloud app 143 stores the token on behalf of the customer or installs the token in a digital wallet of the customer. Retaining possession of the token is not required in some embodiments presented herein and below. In instances where the customer receives the token, the customer can provide the token during online transactions with retailers via transaction manager 133 of the corresponding retail server 130.

In an embodiment, the token is not provided back to the customer and is only retained by token manager 113 on cloud 110. This means that the token is created on cloud 110, managed on cloud 110, and authenticated or validated by could 110 without the token ever being transmitted and exposed over any network wire or communication. This ensures that the token is in secure environment and provides enhanced transaction authorization.

Once the tokens are created and registered and the corresponding smart contracts 151 initiated and installed on the BC 150, system 100 is configured to provide improved transaction authorization beyond which has been conventionally available. The conventional approaches predominately rely two-factor authentication with OTPs verification. As stated above, these type of two-factor authentication can still process as it normally would with the teachings provided herein or be replaced entirely with the teachings provided herein. In either scenario, the teachings provided improved transaction authorization over conventional approaches.

Token manager 113 only accepts token authentication requests from a known and registered FI via its corresponding FI server 120. Requests from retailers or users to authenticate the token are denied. During a transaction workflow, transaction manager 113 provides a form of payment, such as payment card details, and real-time transaction information, such as transaction details and customer details, to the corresponding payment manager 126 of a FI. The FI is needed to provide the payment for the transaction on behalf of the customer. Payment manager 126 provides the real-time information to account manager 123 for verification or authentication. Account manager 123 provides the card details and real-time information to token manager 113. If the real-time information includes a token previously registered by the customer and provided to the customer, account manager 123 also provides the token to the token manager 113.

Any token provided by account manager 123 to token manager 113 causes token manager 113 to check to determine if the token exists. If it does not exist (i.e., has never been registered), the token manager 113 returns a denial back to account manager 123 and account manager 123 informs payment manager 126 of the denial. When the token exists, token manager 113 uses obtains the token identifier or address on the BC 150, the address corresponds to the smart contract 151 associated with the previously registered token. Token manager 113 uses BC API 115 to send the real-time information to the corresponding smart contract 151 via the BC address (i.e., token identifier). The smart contract 151 receives the real-time information as input, evaluates the conditions and returns an indication back to either token manager 113, via BC API 115, or payment manager 126, via BC API 124 which indicates whether the transaction is authorized or not authorized. Transaction authorization occurs when the conditions evaluated by the smart contract 151 are satisfied via the real-time information. When the indication of authorization is provided back to token manager 113, token manager 113 returns the indication of authorization back to payment manager 126 via cloud API 125.

In an embodiment, either account manager 123 and/or token manager 113 use the real-time information associated with the transaction and transaction history information associated with the customer to automatically and intelligently update a token and correspondingly the smart contract 151 associated with a customer. For example, suppose the transaction records of the customer's transaction history indicate that the customer lives in New York City but has booked a flight to and hotel in London on a given date in the future. Based on the transactions, account manager 123 requests that token manager 113 update conditions on the smart contract 151 to include a geofenced area around London as an authorized transaction location for the dates of the reservation. Token manager 113 updates the conditions of the smart contract 151 for the token automatically and without any change being required of the customer. In this way, when the customer performs a transaction with a retail terminal 130 in London on any of the dates associated with the reservation, the transaction will be authorized by token manager 113 and the corresponding smart contract 151. In this way, machine learning or intelligent processing is used to update customer tokens and smart contracts 151 based on patterns and information derived from the customer's transaction history.

In an embodiment, the customer creates a token with conditions linked to specific retailers or merchants. The customer then provides the token to a given retailer via an update to their customer profile with the retailer or during a transaction, such as an online transaction to transaction manager 133. Transaction manager 113 obtains the token via the customer profile or via a transaction interface of retail app 144. The token is provided with the payment details and real-time information to payment manager 126 via FI API 134. When token manager 113 receives the token from payment manager 126, token manager 113 authenticates or validates the token when a retailer identifier for the given retailer is registered to the customer and a given payment card being used has a valid condition that the token is being shared with the retailer identifier. If the token is shared but via a different token associated with a different payment card from what the customer is using, token manager 113 will send a transaction denial back to payment manager 126.

In an embodiment, token manager 113 stores the token itself on the BC 150 based on hashed information associated with the customer's device 140, payment card, and/or customer during registration. In an embodiment, account manager 123 uses a same hashing algorithm as token manager 113 and uses the hashed information during a customer transaction to access the BC 150 via BC API 124 to obtain back the token. The account manager 123 then provides the token along with the real-time customer and transaction information to token manager 113. Token manager 113 authenticates the token (i.e., verifies the token was previously registered) and hashes additional information to locate the smart contract 151 corresponding to the token and further causes the smart contract 151 to evaluate the real-time customer and transaction information to provide an indication of authorization (i.e., transaction authorization or transaction denial) back to token manager 113 and/or payment manager 126). In this embodiment, the token is stored only on cloud 110 and BC 150 and the token is retried by account manager 123 during a transaction. If account manager 123 does not receive back the token from BC 150, the transaction is denied and payment manager 126 sends a transaction denial back to transaction manager 133 via FI API 134. If the token is received back from the BC 150, token manager 113 validates whether the token exists or not as a previously registered token, when the token does not exist, token manager provides a transaction denial back to account manager 123 via cloud API 125. Assuming token manager 113 validates or authenticates the existence of the token, token manager 113 provides the real-time information as input to the corresponding smart contract 151 on the BC 150 and the smart contract 151 provides back an indication of authorization, which either payment manger 126 directly receives or indirectly receives from token manager 113, and payment manager 126 determines whether it is a transaction authorization or a transaction denial.

In an embodiment of the last recited embodiment, when the payment manager 126 is unable to obtain a token from the BC 150. Payment manager 126 nonetheless makes a request to token manager 113 to identify a token, which may be associated with the customer based on the real-time information and customer information for the transaction. This may be a situation where the customer has registered multiple tokens with the token manager 113 and the hashed information used to access the token's value via the BC 150 is unable to return any token value. Here, token manager 113 locates a token corresponding to the customer from the real-time information and/or customer information, authenticates the token, and causes the corresponding smart contract 151 to return an indication of authorization to token manager 113 and/or to payment manager 126.

In an embodiment, a token is geofenced to a predefined geographical area via corresponding condition when the token is registered with token manager 113. The smart contract 151 returns an indication of authorization corresponding to a transaction authorization when a location associated with the customer's device 140 or a location associated with a retail terminal 130 is within the geofenced area. The smart contract 151 returns an indication of authorization corresponding to a transaction denial when a location associated with the customer's device or the retail terminal 130 is outside of the geofenced area. The customer's device location can be included as part of the real-time information for the customer. For example, when the customer is purchasing online via a retail server 130, data associated with the customer's device location can be acquired during the transaction by server 130 and provided as a portion of the real-time information to payment manager 126. If the transaction is associated with an in-person purchase at a terminal 130, a terminal identifier associated with the terminal 130 maps to the terminal's location. In this way, the geofenced location for a transaction is enforced by the smart contract 151 regardless as to whether the customer is purchasing online or in person. This is significant because if a thief has cloned a SIM card of the customer's device 140 and attempts to make online purchases outside of the geofenced area, the smart contract 151 will provided an indication of authorization corresponding to a transaction denial. This is frequently how fraudulent purchases are made by thieves, oftentimes the thieves are in an entirely different country from where the customer resides. System 100 detects such situations and prevents the theft which is not possible with conventional transaction security measures.

In an embodiment, the device 140 is a phone, a tablet, a laptop, a desktop computer, an intelligent processor-enabled appliance, a wearable processing device, or a voice-enabled and network-enabled assistant device (e.g., Amazon Echo®, Google Home®, Apple Siri®, etc.). In an embodiment, retail terminal/server 130 is an ATM, a SST, a POS terminal, or an online transaction server of a retailer.

Figure 2:
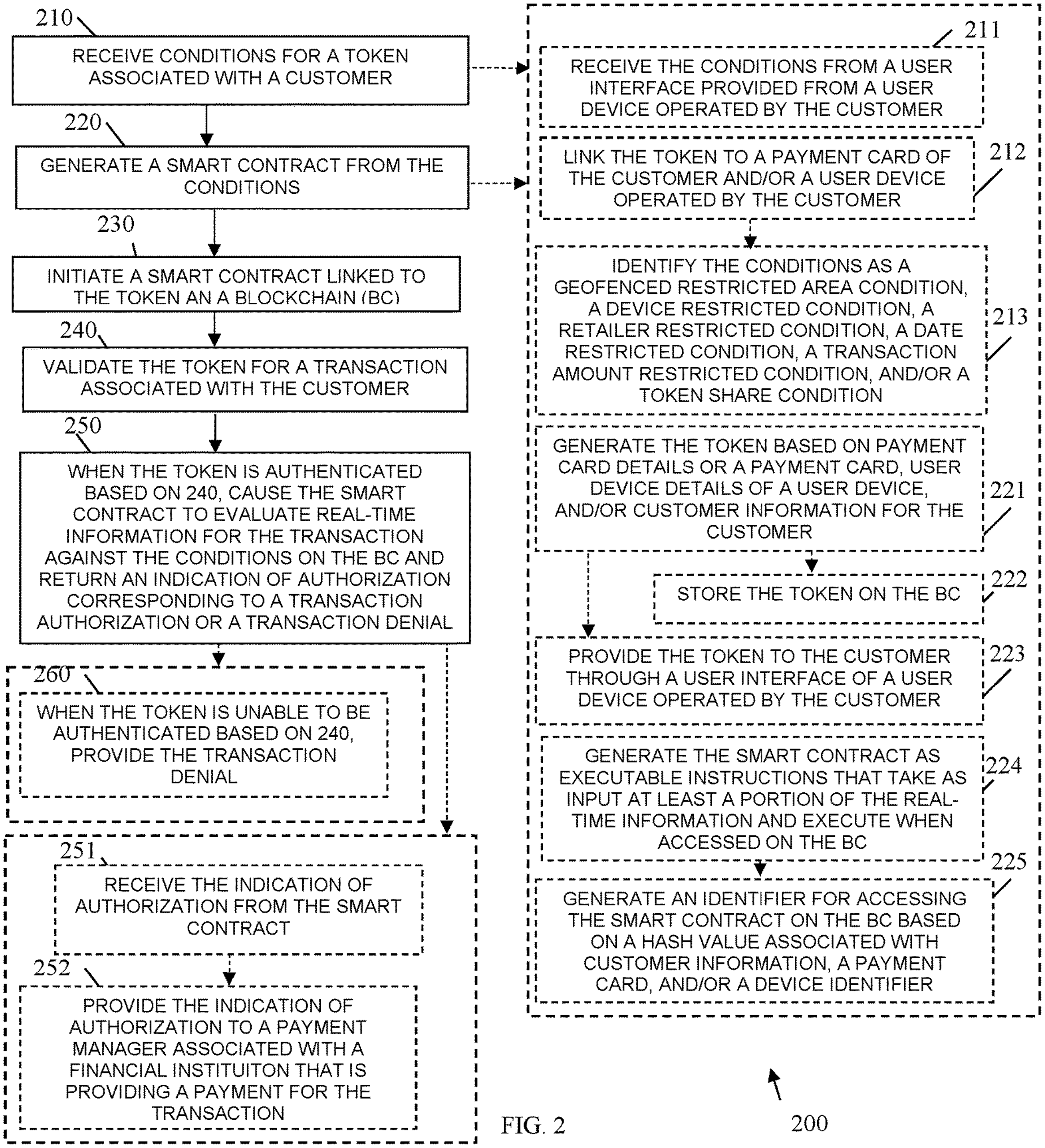
FIG. 2 is a diagram of a method for secure transaction authorization, according to an example embodiment.

The above discussed embodiments and other embodiments are now discussed with reference to FIGS. 2 and 3. FIG. 2 is a diagram of a method 200 for secure transaction authorization, according to an example embodiment. The software module(s) that implements the method 200 is referred to as a "transaction authorizer." The transaction authorizer is implemented as executable instructions programmed and residing within memory and/or a non-transitory computer-readable (processor-readable) storage medium and executed by one or more processors of one or more devices. The processor(s) of the device(s) that executes the transaction authorizer are specifically configured and programmed to process the transaction authorizer. The transaction authorizer may have access to one or more network connections during its processing. The network connections can be wired, wireless, or a combination of wired and wireless.

In an embodiment, the device that executes the transaction authorizer is cloud 110. In an embodiment, the device that executes the transaction authorizer is a FI server 120. In an embodiment, at least a portion of the transaction authorizer is executed by a plurality of devices on BC 150. In an embodiment, the transaction authorizer is executed on a combination of cloud 110, FI server 120, and BC 150. In an embodiment, the transaction authorizer is token manager 113, smart contract manager 114, BC API 115, smart contract 151, account manager 123, BC API 124, cloud API 125, and/or payment manager 126.

At 210, the transaction authorizer receives conditions for a token associated with a customer. In an embodiment, at 211, the transaction authorizer receives the conditions from a user interface of cloud app 143 during a token registration session with transaction authorizer.

In an embodiment, at 212, the transaction authorizer links or maps the token to a payment card of the customer and/or to a user device 140 operated by the customer. In an embodiment of 212 and at 213, the transaction authorizer identifies the conditions as one or more of a geofenced restricted area condition, a retailer restricted condition, a date restricted condition, a transaction amount restricted condition, and/or a token share condition.

At 220, the transaction authorizer generates or creates a smart contract 151 from the conditions. In an embodiment, at 221, the transaction authorizer generates the token based on payment card details of a payment card, user device details of a user device 140, and/or customer information for the customer.

In an embodiment of 221 and at 222, the transaction authorizer stores the token on the BC 150. In an embodiment of 221 and at 223, the transaction authorizer provides the token to the customer through a user interface of a user device 140 operated by the customer. In an embodiment, the user interface is rendered through cloud app 143.

In an embodiment, at 224, the transaction authorizer generates the smart contract 151 as executable instructions that take as input at least a portion of real-time information associated with a transaction and executed when accessed on the BC 150. In an embodiment of 224 and at 225, the transaction authorizer generates an identifier for accessing the smart contract 151 on the BC 150 based on a hash value associated with one or more of customer information, a payment card, and/or a device identifier.

At 230, the transaction authorizer installs and initiates the smart contract 151, which is linked to the token, on the BC 150. At 240, the transaction authorizer validates the token for a transaction associated with the customer.

At 250, the transaction authorizer, when the token is authenticated based on 240, causes the smart contract 151 to evaluate real-time information for the transaction against the conditions on the BC 150 and return an indication of authorization. The indication of authorization corresponds to one of a transaction authorization or a transaction denial.

In an embodiment, at 251, the transaction authorizer receives the indication of authorization from the smart contract 151. In an embodiment of 251 and at 252, the transaction authorizer provides the indication of authorization to a payment manager 126 associated with a FI that is providing a payment for the transaction to a retailer on behalf of the customer.

In an embodiment, at 260, the transaction authorizer, when the token is unable to be authenticated based on 240, provides the transaction denial. In an embodiment, the transaction authorizer provides the transaction denial to a payment manager 126 associated with a FI that is providing a payment for the transaction to a retailer on behalf of the customer.

Figure 3:
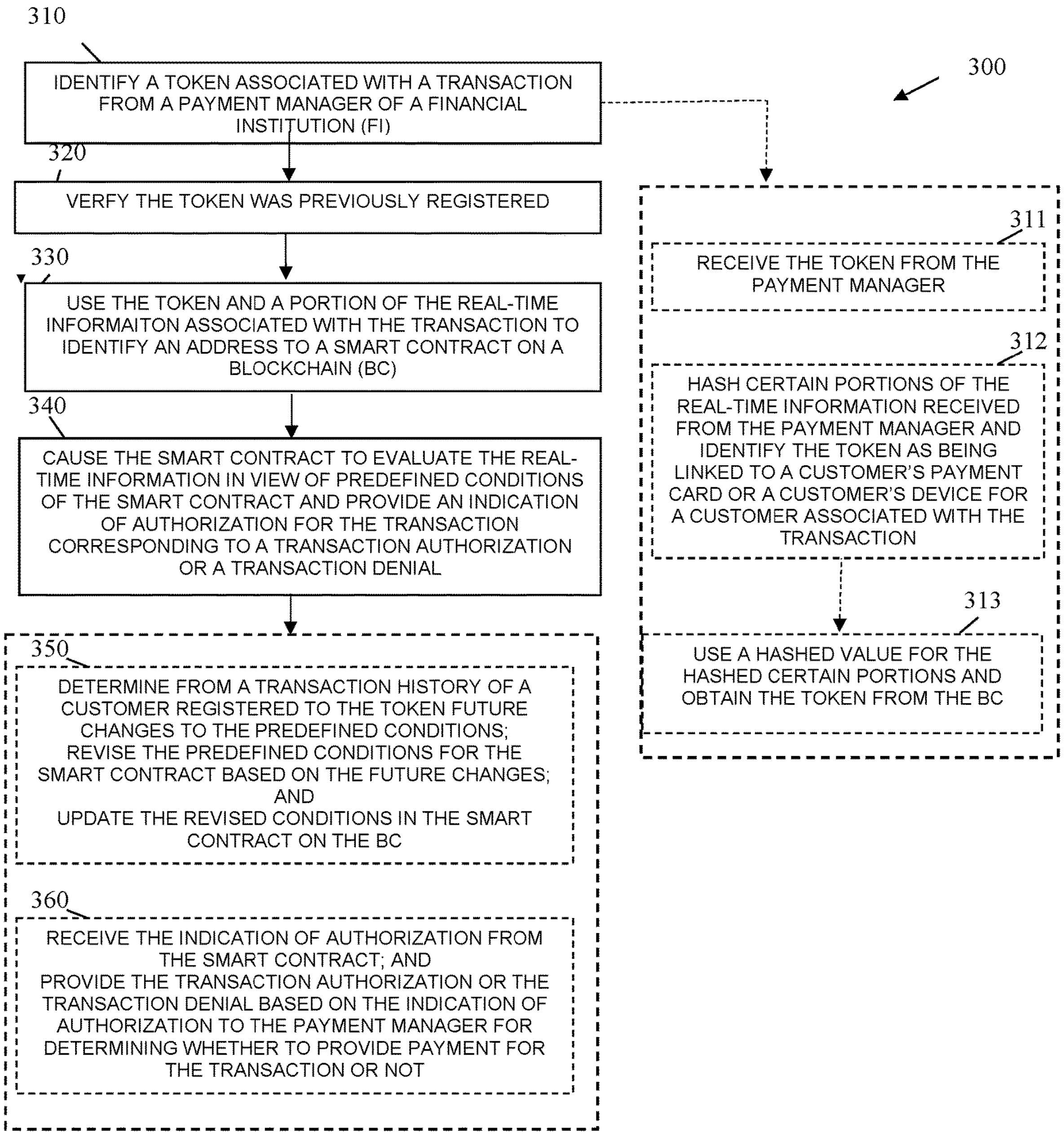
FIG. 3 is a diagram of another method for secure transaction authorization, according to an example embodiment.

FIG. 3 is a diagram of another method 300 for secure transaction authorization, according to an example embodiment. The software module(s) that implements the method 300 is referred to as a "BC transaction authorization manager." The BC transaction authorization manager is implemented as executable instructions programmed and residing within memory and/or a non-transitory computer-readable (processor-readable) storage medium and executed by one or more processors of one or more device(s). The processors that execute the BC transaction authorization manager are specifically configured and programmed for processing the BC transaction authorization manager. The BC transaction authorization manager may have access to one or more network connections during its processing. The network connections can be wired, wireless, or a combination of wired and wireless.

In an embodiment, the device that executes the BC transaction authorization manager is cloud 110. In an embodiment, the device that executes the BC transaction authorization manager is a FI server 120. In an embodiment, at least a portion of the BC transaction authorization manager is executed by a plurality of devices on BC 150. In an embodiment, the BC transaction authorization manager is executed on a combination of cloud 110, FI server 120, and BC 150. In an embodiment, the BC transaction authorization manager is token manager 113, smart contract manager 114, BC API 115, smart contract 151, account manager 123, BC API 124, cloud API 125, payment manager 126, and/or method 200. The BC transaction authorization manager presents another and, in some ways, enhanced processing perspective from that which was discussed above for system 100 and method 200.

At 310, the BC transaction authorization manager identifies a token associated with a transaction from a payment manager 126 of a FI. In an embodiment, at 311, the BC transaction authorization manager receives the token from the payment manager 126. In an embodiment, at 312, the BC transaction authorization manager hashes certain portions of the real-time information received from the payment manager 126 and identifies the token as being linked to the customer's payment card or a customer's device 140 for a customer associated with the transaction. In an embodiment of 312 and at 313, the BC transaction authorization manager uses a hashed value for the hashed certain portions and obtains the token from the BC 150.

At 320, the BC transaction authorization manager verifies the token was previously registered. In an embodiment, the BC transaction authorization manager determines if the token is mapped to a table of registered tokens to determine if the token exists or does not exist.

At 330, the BC transaction authorization manager uses the token and a portion of the real-time information associated with the transaction to identify an address to a smart contract 151 on the BC 150. The smart contract 151 is linked to the token.

At 340, the BC transaction authorization manager causes the smart contract 151 to evaluate the real-time information or at least a portion of the real-time information in view of predefined conditions of the smart contract 151. This further causes the smart contract 151 to provide an indication of authorization. The indication of authorization is either a transaction authorization for the transaction or a transaction denial for the transaction.

In an embodiment, at 350, the BC transaction authorization manager determines from a transaction history of a customer registered to the token future changes that are needed to the predefined conditions of the smart contract 151. The BC transaction authorization manager revises the predefined conditions for the smart contract 151 and updates the revised conditions in the smart contract 151 on the BC 150. This is a situation where changed conditions are predicted based on a machine learning, artificial intelligence, or heuristic algorithm from the customer's transaction history and prophylactic and dynamic changes to the conditions of the smart contract 151 are made in advance of and before the changed conditions are encountered in a subsequent transaction history of the customer in the future.

In an embodiment, at 360, the BC transaction authorization manager receives the indication of authorization from the smart contract 151. The BC transaction authorization manager provides the transaction authorization, or the transaction denial based on the indication of authorization to the payment manager 126 for determining, by the payment manager 126 whether to provide a payment for the transaction or not on behalf of the customer to conclude the transaction between the customer and a retailer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

identifying a token associated with a transaction from a payment manager of a financial institution (FI) server, wherein only a known and registered FI can request the token be validated and wherein requests from retailers and users to authenticate the token are denied;

verifying the token was previously registered;

using at least the token and at least a portion of real-time information associated with the transaction to identify an address to a smart contract on a blockchain (BC);

denying the transaction when the token does not exist as a previously registered token; and causing the smart contract to evaluate the real-time information in view of predefined conditions of the smart contract and provide an indication of authorization for the transaction corresponding to a transaction authorization or a transaction denial, wherein the smart contract only evaluates the real-time information after the token has been authenticated by a key vault, and wherein only a registered and known FI can request that the token be validated for access to the smart contract.

2. The method of claim 1 further comprising:

determining from a transaction history of a customer registered to the token for future changes to the predefined conditions of the smart contract;

revising the predefined conditions for the smart contract based on the future changes; and updating the revised predefined conditions in the smart contract on the BC.

3. The method of claim 1 further comprising:

receiving the indication of authorization back from the smart contract; and providing the transaction authorization or transaction denial to the payment manager for determining whether to provide a payment for the transaction or not.

4. The method of claim 1, wherein identifying further includes receiving the token from the payment manager.

5. The method of claim 1, wherein identifying further includes hashing certain portions of the real-time information received from the payment manager and identifying the token as being linked to a customer's payment card or a customer's device for a customer associated with the transaction.

6. The method of claim 5, wherein identifying further includes using a hashed value for the hashed certain portions and obtaining the token from the BC.

* * * * *